May 7, 1935. S. N. BUCHANAN 2,000,374
ENTRANCE FITTING
Filed Sept. 13, 1933 2 Sheets-Sheet 1
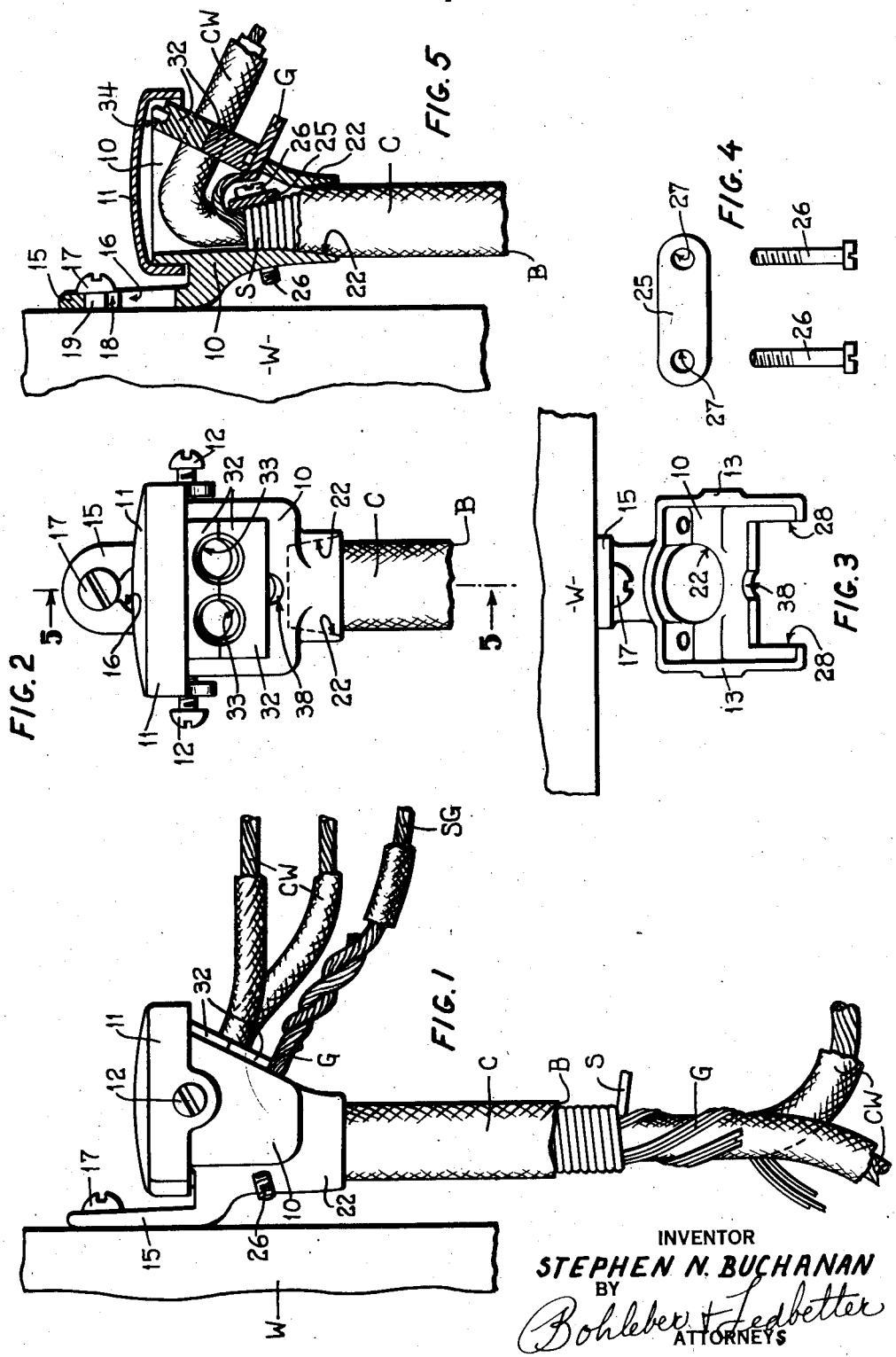
INVENTOR
STEPHEN N. BUCHANAN
BY
Bohleber & Ledbetter
ATTORNEYS May 7, 1935.  S. N. BUCHANAN  2,000,374
ENTRANCE FITTING
Filed Sept. 13, 1933   2 Sheets-Sheet 2
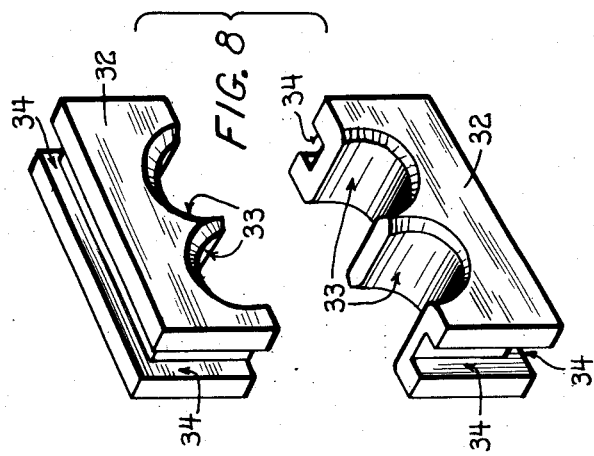
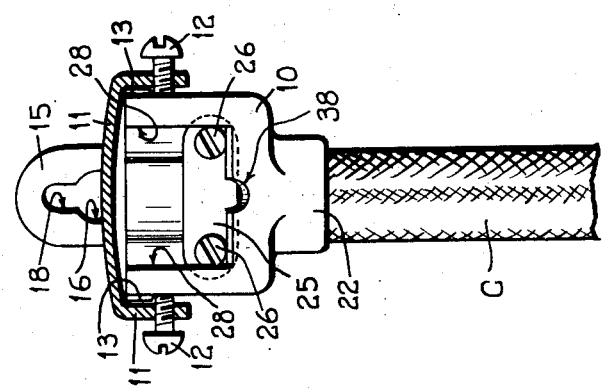
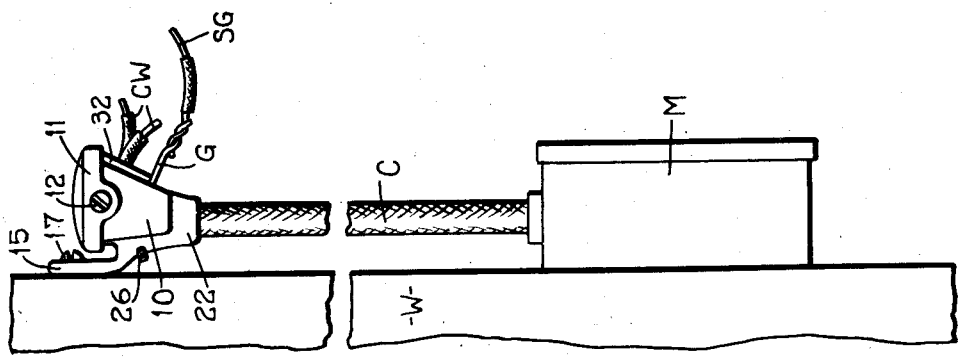
INVENTOR
STEPHEN N. BUCHANAN
BY
Bohleber & Ledbetter
ATTORNEYS Patented May 7, 1935

2,000,374

UNITED STATES PATENT OFFICE 2,000,374

ENTRANCE FITTING

Stephen N. Buchanan, Elizabeth, N. J., assignor to The Thomas & Betts Co., Elizabeth, N. J., a corporation of New Jersey Application September 13, 1933, Serial No. 689,181

12 Claims. (Cl. 247—6)

This invention relates to electrical conduit devices and more particularly to an entrance fitting adapted to be secured to a supporting structure such as the side of a house or building.

The entrance fitting is usually attached to the outer wall of the building well above the ground and the wires from the electrical supply lines in the street lead thereto. A cable electrically connected with the wires from the street extends from the entrance fitting downwardly along the outer wall of the building or other structure to a meter box or some other electrical fitting or device mounted on the wall adjacent or at the foundation of the building and at which point the cable enters the building.

An object of this invention is to produce an entrance fitting particularly adapted for that type of electrical cable having a ground wire applied to or spiralled around the inner circuit wires and an armor surrounding said ground wire and in electrical contact therewith; and usually this armor is covered with an outer heavily impregnated insulating braid. An example of this type of electrical cable is shown herein.

Another object of the invention is to produce an entrance fitting in which a clamp and its operating means for securing the upright cable to the entrance fitting is within the casing or housing of said fitting.

Another object is to produce an entrance fitting in which the cable clamp and its operating means is mounted, as aforesaid, within the housing and one side of the latter is open for access to the operating means by which a workman on the job tightens the clamp and anchors the cable to the fitting.

A further object is to produce an entrance fitting having a cable clamping means within the housing of the device for securing a cable thereto, in which one side of the housing is open to render accessible the operating means of the clamp, and a removable wire bushing member closes the open side of the fitting and has wire passage means to direct the circuit wires of the cable toward the feed lines or main in the street.

A still further object is to produce an entrance fitting, the housing of which has a large top opening which affords accessibility in handling and directing the wires of the cable down into the open side of the fitting and into a removable bushing which closes this opening, together with a removable cap which not only closes the large open top of the fitting, after the wiring installation is complete, but serves a further purpose of locking the removable bushing in place.

Another object of the invention is to produce an entrance fitting comprising a hollow housing having a tapered passage or cable receiving neck leading up thereinto, which tapered neck is adapted to engage the external braiding of the cable and hold it securely against raveling. This taper preferably is of sufficient angularity to receive and engage the outer braid raw edge end of more than one size of cable.

Other objects of the invention will be more apparent from the following description taken in connection with the accompanying drawings showing an example of the invention, wherein;

Figure 1 is a side view of the entrance fitting secured to a supporting structure such as the side of a house or building and showing the wires of the cable ready to receive and connect with the street feed wires; and also showing a ground wire connection adapted to lead back to the street. This view also shows the details of one type of electrical cable for which my entrance fitting is particularly adapted, said cable leading downwardly along the building wall.

Figure 2 is a front view of the entrance fitting with a fragment of cable extending up thereinto.

Figure 3 is a top view of the housing of the, entrance fitting, the cover or cap and the removable bushing member being removed.

Figure 4 shows the cable clamp plate and its operating means or tightening screws detached from the housing of Figure 3.

Figure 5 is a longitudinal section taken on the line 5—5 of Figure 2, but showing the entrance fitting mounted on a support or building wall and the clamping means gripping a cable within the housing, together with the circuit wires and ground conductor from the cable made ready for the street wiring connections.

Figure 6 shows a general assembly or an electrical installation on the wall of a building, in which my entrance fitting is used, together with the meter down to which the cable runs from said entrance fitting.

Figure 7 is a front view of the entrance fitting with the top cap or cover in cross section showing the manner in which said cap is secured to the housing of said fitting. The view also shows the removable bushing detached from the open side, thereby exposing the interior of the housing, thus showing the operating means for the cable clamp or plate accessible through said open side.

Figure 8 is an enlarged perspective view of a removable insulating bushing which closes the open side of the housing and through which the cable circuit wire ends are projected to make connection with the street wiring.

Electrical cables have now been adopted and approved by the trade and by the underwriters' laboratories in substitution of the rigid conduits having wires running therethrough heretofore used to make an electrical feed installation leading into a building from an entrance fitting located well above the ground upon the side wall of said building. These new cables require an entrance fitting particularly adapted thereto and which accommodate the ground conductor carried by the cable. My invention fulfills these requirements.

This entrance fitting comprises a casing or housing 10 tapering outwardly in the front and towards a fully open top, and a cover or cap 11 closes said open top. The cover or cap 11 is secured in position by screws 12 carried in a depending flange, said screws engaging each side wall of the housing 10 below retaining or locking lugs 13 shown in Figures 3 and 7. Any suitable form of cap securing means may of course be used. The housing has parallel upright side walls, a rear upright wall, and a front wall tapering out and upwardly as shown.

The housing 10 carries an upright bracket 15 on its rear wall with an opening 16 therein large enough to pass over the head of a bolt or screw 17 secured in a wall W. A slot 18 connects with the opening 16 to receive the body 19 of the screw 17. In installing the fitting, a screw 17 is set into the wall W, the fitting 10 is attached to the end of a cable C, the workman passes the bracket hole 16 over the screw 17, adjusts the slot 18 down on the screw shank 19, and then tightens the screw which anchors the device to the wall. Other wall attaching means for the fitting 10 may be used.

The cable C comprises circuit wires CW covered by the usual insulation and one or more strands of grounding conductor wire G are ordinarily spirally wound. An armor sheathing is wound around the grounding wire G and in contact therewith. An outer final braid B is woven around the armor sheath S and heavily impregnated with insulating material. The entrance fitting described herein is particularly adapted for this type of house entrance cable, although my device is adapted for other forms of cables as well.

The housing 10 has an upright neck or cable entry passage 22 leading upwardly through its bottom for the reception of the cable C. The cable neck 22 is formed through a neck depending from the housing 10 and is tapered so that the cable C inserted therein will engage and hold the edge of the external braiding B and thereby prevent it from raveling. The upward taper 22 may be made with a perceptible angle so that more than one size of cable is adapted to be received thereinto. The cable neck 22, decreasing in size upwardly as shown in Figures 2 and 5, admits a small size cable braiding B far up in the housing neck, while a larger size cable C stops at a lower point. In either case, the raw cut edge of the braid B bears against the inner wall of the passage 22 and prevents raveling and maintains a finished clean installation.

A cable clamp plate 25 is located horizontally within the upright housing 10 of the entrance fitting. Operating means, such as the screws 26, pass freely through openings 27 in the ends of the clamp plate 25 and are screwed into the upright back wall of the housing 10. A side wall, more particularly the front of the housing 10, has a rectangular opening 28 through which the operating means or screws 26 are accessible to a screw driver for tightening the clamping plate 25 down on the cable C and anchoring it to the housing 10. Before clamping the cable C in position, the braid B is removed so that the ground conductor G and armor sheath S are exposed.

The exposed armor S of the cable is placed underneath the clamp plate 25 so that in tightening the operating screws 26, the clamp plate 25 forcibly engages the armor S to clamp the cable C within the housing 10. In this clamping operation, the armor S is necessarily clamped tightly against the ground wires G so that a positive electrical ground contact is made. The tightening of the clamp plate 25 on the cable C therefore forcibly brings the armor S into good electrical contact with the housing 10 which serves to render the installation safe by a grounded electrical connection from the exposed metal fitting 10 to the earth.

After the foregoing installation is made, the ground wire G and armor sheath S are then grounded in turn, through a meter box M or other electrical fitting used at this point, to a water pipe within the house or building W in the usual way. In addition to this ground connection established through the box M and building, the ground wire G of the cable C may also be extended out through the housing 10 and connected with a street ground wire SG through a transformer connected with the power lines or mains in the street. Hence a dual grounding is effected for the fitting 10 through the cable ground wire G and the street ground wire SG.

The view in Figure 7 shows clearly how the operating screws 26 for the clamp plate 25 are easily accessible through the rectangular opening 28 in the front wall of the housing 10 defined by the parallel upright edges also denoted 28. The opening or edges 28 is formed in the inclined or tapered front wall of the housing 10. A removable means or wire insulating bushing member 32, shown in detail in Figure 8, closes the front wall opening 28. This closure bushing is rectangular in shape and is made with one or more wire passages 33 through which the circuit wires CW are passed out of the housing 10. Two such passages 33 are shown in the removable member 32, one opening being provided for each circuit wire. This bushing is preferably split horizontally through the wire passages 33 so that one portion of the removable member 32 may be first inserted in the opening 28 and the wires CW bent down into the wire passages 33. The other half portion of the bushing member 32 is then inserted in the opening 28 above the wires CW to completely enclose the opening and permit the wires to project from the fitting.

The removable split bushing 32 preferably has a marginal groove 34 around its edges, or in three sides thereof. These grooves 34 receive the exposed edges of the opening 28 to form tongue and groove slide joint means which removably retain the bushing means 32 in position in the opening 28. The two bushing sections 32 are interchangeable so that it is immaterial which is placed in the bottom of the opening 28. Whichever portion is first inserted, the groove 34 thereof receives the exposed bottom edge of the opening 28 and secures it in place and forms a seal to close the front of the housing 10. The split removable closure member 32 is preferably made of insulating material which will not cut and chafe the wires CW and which also insulates against a short circuit through the entrance fitting. The cover or cap 11 is next secured in position and retains the removable member 32 against removal.

The front bushing opening 28 has a recess 38 in the bottom thereof extending below the removable bushing member 32. The grounding wires G, which are wrapped around the wires CW of the cable, may be bunched and twisted together, as shown in Figures 1 and 5, passed over the clamping means 25, then through the recess 38, prior to inserting the bushing 32, and are connected with the street ground wire SG which may be grounded at a transformer carried on the street pole in the usual way.

Various modifications will occur to those skilled in the art in the configuration, composition and disposition of the component elements going to make up the invention as a whole, as well as in the selective combination or application of the respective elements, and no limitation is intended by the phraseology of the foregoing description or illustrations in the accompanying drawings.

What is claimed is:

1. An entrance fitting comprising, a housing having an open top, means for securing the housing to a supporting structure with the open top facing upwardly, a cable receiving passage leading into the bottom of the housing and directed towards the open top thereby rendering it easy to pull a wire or cable through the cable receiving passage, the housing having an opening in one side thereof, a removable member covering the opening, a wire passage leading out through the removable member, a cable clamp, operating means therefor within the housing and being operable through the side opening, and a cap fitted over the open top.

2. An entrance fitting comprising, a housing having an open top, means for securing the housing to a supporting structure with the open top facing upwardly, a cable receiving passage leading into the bottom of the housing and directed upwardly towards the open top thereby rendering it easy to pull a wire or cable through the cable receiving passage, the housing having an opening in one side thereof, a removable insulating member covering the opening, a clamping means within the housing including operating means to actuate the same, the operating means being operable through the opening in the side of the housing, and a cap fitted on the open top.

3. An entrance fitting comprising, a housing having an open top, means for securing the housing to a supporting structure, a cable receiving neck formed through the bottom of the housing, the neck being tapered inwardly to wedge a cable therein, a wire passage leading out of the housing, a clamping means within the housing in line with the neck adapted to clamp the cable thereto, and a cap fitted over the open top.

4. An entrance fitting comprising, a housing having an open top, means for securing the housing to a supporting structure, a cable receiving neck leading into the housing and directed upwardly towards the open top thereby rendering it easy to pull a wire or cable through the cable receiving passage, the housing having an opening in the front side wall thereof, a split insulating member removably mounted in the opening, a wire passage leading out through the split insulating member with the passage divided by the split, a cable clamp and operating means within the housing, the operating means being operable through the housing opening, and a cap for the open top.

5. An entrance fitting comprising, a housing having an open top, means for securing the housing to a supporting structure, a cable receiving neck through the bottom of the housing and directed upwardly towards the open top thereby rendering it easy to pull a wire or cable through the cable receiving passage, the housing having an opening in one side thereof, a removable member covering the opening, a wire passage through the removable member, a cable clamping means within the housing and carried on the side thereof opposite to the opening, including operating means to actuate the clamping means, the operating means being operable through the opening in one side of the housing, and a cover cap for the open top.

6. An entrance fitting comprising, a housing having an open top, means for securing the housing to a supporting structure, a cable receiving neck leading into the housing, the housing having an opening in one side thereof, a split insulating bushing removably closing the opening, a wire recess in the side of the housing and at the bottom of the opening under the split insulating bushing, a wire passage through the split insulating member with the passage divided by the split, a cable clamping means within the housing including operating means to actuate the same, the operating means being operable through the opening in the side of the housing, and a cap for the open top.

7. An entrance fitting comprising, a housing having an open top, means for securing the housing to a supporting structure, a cable receiving passage leading into the housing and directed upwardly towards the open top thereby rendering it easy to pull a wire or cable through the cable receiving passage, the front of the housing being open, a removable member covering the open front, a wire passage leading out through the removable member, a clamp plate in the housing in alignment with the cable receiving passage, a pair of operating screws engaging the ends of the clamp plate to actuate the same and spaced on each side of the cable receiving passage, the operating screws being operable through the open front, and a cap for the open top.

8. An entrance fitting comprising, a housing having a large open top and downwardly directed wall terminating in a reduced size interior at the bottom, a cable entry neck carried at the bottom of the housing and leading into the reduced size interior and directed upwardly towards the open top thereby rendering it easy to pull a wire or cable through the cable receiving passage, a cable clamp plate and operating screws mounted at the bottom of the housing in alignment with the neck, wire outlet passage means leading from the housing above the cable clamp plate and its operating screws, a cap over the large open top and having a marginal flange fitting down over the housing, anchorage screws carried by the marginal flange on the cap and tightened up against the top outer surface of the housing, and an upright attaching bracket integral with the housing and projecting above the cap and provided with screw receiving and wall anchorage means.

9. An entrance fitting comprising, a housing having an upright rear wall, an attaching bracket carried on the rear wall and extending above the housing, said rear wall extending downwardly and terminating in a cable receiving neck, the neck forming a cable passage directed upwardly towards the open top thereby rendering it easy to pull a wire or cable through the cable receiving passage, a horizontally disposed cable clamp carried in the housing on the rear wall thereof above the cable receiving neck, said housing including a front wall extending upwardly from the cable receiving neck and directed outwardly from the rear wall at an angle thereto and forming an enlarged open housing top above and forward of said neck and in front of the attaching bracket, the front wall of the housing having a rectangular opening extending from the top edge of the housing downwardly to a point proximate the horizontal cable clamp and said opening defined at its bottom by a horizontal edge, a rectangular split bushing having a wire passage and said bushing being disposed in the front wall opening, tongue and groove joint means providing a sliding connection between the opening and the bushing, and a cap having a downwardly directed marginal flange covering the large open top of the housing and embracing the bushing to fasten the latter in place.

10. An entrance fitting comprising, spaced upright end walls closed by an upright rear wall and the front of which is defined by spaced parallel edges extending upwardly and outwardly from the rear wall, said wall formation producing a housing having a large open top through which cable wires are manipulated, and a reduced size lower end interior with a cable receiving neck opening into the latter, the neck forming a cable passage directed upwardly towards the open top thereby rendering it easy to pull a wire or cable through the cable receiving passage, a cable clamp plate disposed across the neck opening and an operating screw at each end of the clamp plate and said screws being threaded into the rear wall, a wiring bushing also having parallel upright edges and forming a front wall in the housing and being removable to expose the clamp plate and enabling the operating screws aforesaid to be operated therethrough, tongue and groove marginal joint means sealing the bushing in the housing, and a cap over the large open top of the housing to close the same and over the upper edge of the removable bushing to secure the latter in position.

11. An entrance fitting for use in connection with electrical cable having internal circuit wires, outer ground conductor, armor sheathing thereover, and external braiding over the armor sheathing; comprising an upright housing having a cable entrance at its bottom including a tapering upright neck into which the raw end edge of the external braiding is thrust, and above which projects the exposed armor sheathing into the housing, with the ground conductor protruding from under said armor and extending thereabove further up into said housing, a horizontally disposed clamp plate extending across the upright neck and engaging the armor and pressing the latter against the neck and against the ground conductor, said housing having a large open top through which a workman reaches the circuit wires and the ground conductor, a recess in the front of the housing and through which the ground conductor is directed by bending it over the clamp plate, an opening formed in the front of the housing above the recess, a removable bushing closing said opening, the circuit wires bent over above the ground conductor and clamp plate and projected from the housing through the bushing, and a cap closing the large open top and fitting over the removable bushing.

12. An entrance fitting connection comprising, a cable having a grounding wire, a metallic housing having an open top, means for securing the housing to a supporting structure, a cable receiving neck leading into the housing, the housing having an opening at the front side thereof, a removable member covering the opening, a wire passage out through the removable member, a cable clamping means within the housing including operating means to actuate the same, the operating means being operable through the opening in the side of the housing, a cap for the open top, and a ground wire opening through the housing having at least a part thereof in the metal, the ground wire passing through the ground wire opening.

STEPHEN N. BUCHANAN.